US010161331B2

(12) United States Patent
Mazzara Bologna et al.

(10) Patent No.: US 10,161,331 B2
(45) Date of Patent: Dec. 25, 2018

(54) METHOD OF OPERATING A SELECTIVE CATALYTIC REDUCTION ON FILTER OF AN AUTOMOTIVE SYSTEM

(71) Applicant: GM GLOBAL TECHNOLOGY OPERATIONS LLC, Detroit, MI (US)

(72) Inventors: Giuseppe Mazzara Bologna, Nicosia (IT); Andrea De Filippo, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 385 days.

(21) Appl. No.: 15/177,974

(22) Filed: Jun. 9, 2016

(65) Prior Publication Data

US 2016/0363069 A1    Dec. 15, 2016

(30) Foreign Application Priority Data

Jun. 10, 2015 (GB) .................................. 1510092.8

(51) Int. Cl.
| | |
|---|---|
| *F01N 3/00* | (2006.01) |
| *F02D 41/02* | (2006.01) |
| *F01N 3/035* | (2006.01) |
| *F01N 3/20* | (2006.01) |
| *F01N 11/00* | (2006.01) |
| *F02D 41/14* | (2006.01) |

(52) U.S. Cl.
CPC ............ *F02D 41/029* (2013.01); *F01N 3/035* (2013.01); *F01N 3/2066* (2013.01); *F01N 11/002* (2013.01); *F02D 41/1446* (2013.01); *F01N 2610/02* (2013.01); *F02D 41/1441* (2013.01); *F02D 2041/0265* (2013.01); *F02D 2200/0812* (2013.01)

(58) Field of Classification Search
CPC .................................................. F02D 41/1446
See application file for complete search history.

(56) References Cited

U.S. PATENT DOCUMENTS

| 2007/0144146 | A1 | 6/2007 | Kusatsugu | |
|---|---|---|---|---|
| 2009/0012694 | A1* | 1/2009 | Darr ........................ | F01N 3/021 701/102 |
| 2009/0182479 | A1* | 7/2009 | Daneau ................ | F02D 41/029 701/102 |

(Continued)

FOREIGN PATENT DOCUMENTS

JP        2002070619 A   *  3/2002

OTHER PUBLICATIONS

Machine English Translation of JP2002070619A.*
Great Britain Patent Office, Great Britain Search Report for Great Britain Application No. 1510092.8, dated Dec. 3, 2015.

*Primary Examiner* — Mark Laurenzi
*Assistant Examiner* — Jason Sheppard
(74) *Attorney, Agent, or Firm* — Lorenz & Kopf, LLP (57) ABSTRACT

A method of operating a Selective Catalytic Reduction on Diesel Particulate Filter or SDPF is disclosed. During a SDPF regeneration; temperature values are obtained for the SDPF inlet and SDPF outlet. The temperature values are used to calculate a rate of increase of SDPF outlet temperature and a rate of increase of SDPF inlet temperature. A ratio between the rate of increase of SDPF outlet temperature values and the rate of increase of SDPF inlet temperature values is calculated, and if the ratio is greater than a threshold thereof, the exhaust gas composition is modified in some manner.

14 Claims, 5 Drawing Sheets

(56) References Cited

U.S. PATENT DOCUMENTS

2009/0241513 A1* 10/2009 Collins .................. F01N 3/023
                                                                                      60/274

2010/0050608 A1    3/2010  Jayachandran et al.

* cited by examiner

METHOD OF OPERATING A SELECTIVE CATALYTIC REDUCTION ON FILTER OF AN AUTOMOTIVE SYSTEM

CROSS-REFERENCE TO RELATED APPLICATION

This application claims priority to Great Britain Patent Application No. 1510092.8, filed Jun. 10, 2015, which is incorporated herein by reference in its entirety.

TECHNICAL FIELD

The present disclosure pertains to a method of operating a Selective Catalytic Reduction on Diesel Particulate Filter (SDPF) of an automotive system.

BACKGROUND

It is known that internal combustion engines, and in particular Diesel engines, are equipped with exhaust gas aftertreatment systems. Aftertreatment systems treat exhaust gases that exit the combustion chamber and that are directed into an exhaust pipe having one or more aftertreatment devices configured to filter and/or change the composition of the exhaust gases, such as for example an Oxidation Catalyst (DOC), a Diesel Particulate Filter (DPF), a Lean $NO_x$ Trap (LNT), and/or a Selective Catalytic Reduction (SCR) system or a SDPF (SCR on Diesel Particulate Filter).

The SCR is a catalytic device in which the nitrogen oxides ($NO_x$) contained in the exhaust gas are reduced into diatomic nitrogen ($N_2$) and water ($H_2O$), with the aid of a gaseous reducing agent, typically ammonia ($NH_3$), that is absorbed inside the catalyst. The ammonia is obtained through thermo-hydrolysis of a Diesel Exhaust Fluid (DEF), typically urea ($CH_4N_2O$) that is injected into the exhaust gas pipe through a dedicated injector located between the DPF and the SCR.

For future diesel passenger cars, Euro and US emission legislations will require a greater reduction of exhaust emission in terms of $NO_x$, compatibly with an increase of fuel economy ($CO_2$ reduction). This goal requires a redesign of the current aftertreatment architecture. in particular, the integration of SCR. functionalities within a filter substrate (SDPF) provides vehicles that are cleaner, more efficient and more capable of obtaining fuel savings. This is the reason why recently, Selective Catalytic Reduction wash coated particulate filters (also referred to as SDPFs) have been introduced in the aftertreatment system architecture.

A SDPF is an SCR (Selective Catalytic Reduction) catalyst coated on a porous DPF (Diesel Particular Filter). However, these technical developments lead to more complex aftertreatment systems which, in combination with the current stringent regulation requirements, require a dedicated management, in particular during filter regeneration processes when the exhaust gas temperature are increased above 600° C. to efficiently burn the loaded soot/particulate matter stored inside the particulate filter. More specifically the presence of the SCR coating into the filter substrate requires a very precise control of the temperatures inside the filter, in order to avoid any potential damage or over-aging of the SCR coating, damage that may occur typically if temperatures reach values above 850° C.-900°°C.

It may be necessary to remove the particulate matter or soot that progressively accumulates inside the filter to prevent the pressure drop across the filter from becoming excessive in order to guarantee and/or restore the efficiency of the particulate filter. This process, which is conventionally known as DPF regeneration, is achieved by increasing the temperature of the exhaust gases entering the DPF (typically up to 630° C.), which in their turn heat the filter up to a temperature at which the accumulated particulate burns off.

A known strategy to increase the exhaust gas temperature provides for the exhaust gases to be mixed with a certain amount of unburned fuel (HC) that oxidizes in the oxidation catalyst, thereby heating the exhaust gases that subsequently pass through the DPF. The unburned fuel may come from the engine cylinder thanks to the so called after injections or may be supplied by means of a dedicated fuel injector, which may be located directly in the exhaust pipe, for example upstream of the DOC. During regeneration processes specific conditions might occur which could led to very high temperature events as consequence of soot burning. These conditions are represented by very high amount of soot loaded (for example for values of soot greater than 8 g/l) and by instantaneous reduction of exhaust flow rates with still enough oxygen to burn soot.

Currently, no defined strategy to predict an unexpected over-temperature event, also known as Drop To Idle (DTI) event, during the filter regeneration inside the SDPF component is known.

SUMMARY

In accordance with the present disclosure a strategy is provided to predict the occurrence of excessive temperature events inside the SDPF and to predict a Drop to Idle (DTI) event in order to determine if countermeasures to mitigate the thermal shock during DTI are needed. An embodiment of the present disclosure provides a method of operating a Selective Catalytic Reduction on Diesel Particulate Filter (SDPF) of an automotive system including an internal combustion engine equipped with an aftertreatment system for treating exhaust gas. A SDPF regeneration is performed; Temperature values for the SDPF inlet and SDPF outlet are obtained during the SDPF regeneration. The obtained SDPF inlet and SDPF outlet temperature values are used to calculate a rate of increase of SDPF outlet temperature and a rate of increase of SDPF inlet temperature. A ratio between the rate of increase of SDPF outlet temperature values and the rate of increase of SDPF inlet temperature values is then calculate, and if the calculated ratio is greater than a threshold thereof, the exhaust gas composition is modified. Implementation of this strategy helps to avoid excessive increase of temperature inside the SDPF, for example in case of a DTI event, thus preventing this component from hardware damage and avoiding premature aging of the same. Moreover, this strategy helps to predict thermal events which may cause a high value of the Incidents Per Thousand Vehicles (IPTV) parameter. Appropriate countermeasures based on modifying the exhaust gas composition can thus be promptly taken.

According to another embodiment of the present disclosure, obtaining SDPF inlet and SDPF outlet temperature values is performed by respective SDPF inlet and outlet temperature sensors. An effect of this embodiment is that current and reliable values of temperature are obtained in real time.

According to another embodiment of the present disclosure, modifying the exhaust gas composition includes reducing the oxygen quantity in the exhaust gas. An effect of this embodiment is that it helps preventing an overheating of the SDPF.

According to another embodiment of the present disclosure, reducing the oxygen quantity in the exhaust gas is performed by operating a valve connecting a long route EGR conduit to an intake duct of the internal combustion engine. An effect of this embodiment is that the oxygen content in the exhaust gas can be modified according to the needs.

According to still another embodiment of the present disclosure, reducing the oxygen quantity in the exhaust gas is performed by operating a throttle valve regulating a flow of air into an intake manifold of the internal combustion engine. Also this embodiment has the effect that the oxygen content in the exhaust gas can be modified according to the needs.

According to still another embodiment of the present disclosure, modifying the exhaust gas composition is performed by varying a fuel injection quantity. An effect of this embodiment is to regulate and reduce the temperature of the SDPF.

According to a further embodiment of the present disclosure, modifying the exhaust gas composition is performed by varying a fuel injection timing. An effect of this embodiment is to regulate and reduce the temperature of the SDPF.

According to a further embodiment of the present disclosure, modifying the exhaust gas composition is performed by interrupting a SDPF regeneration. An effect of this embodiment is to reduce the temperature of the SDPF.

According to another embodiment of the present disclosure, the threshold value is a function of a percentage of the duration of the SDPF regeneration. An effect of this embodiment is that the threshold value can be effectively calibrated depending on the specifics of the regeneration process.

According to still another embodiment of the present disclosure, the threshold value is a function of an estimated soot residual quantity in the SDPF. An effect of this embodiment is that the threshold value can be effectively calibrated depending on the current conditions of the SDPF.

According to a further embodiment of the present disclosure, calculating a ratio between the rate of increase of SDPF outlet temperature values and the rate of increase of SDPF inlet temperature values is performed if the SDPF regeneration has been performed for less than a predetermined percentage of its duration. An effect of this embodiment is to have enough time at the start of the regeneration process to predict the occurrence of a possible Drop To Idle (DTI) event.

Another aspect of the present disclosure provides an apparatus for operating a Selective Catalytic Reduction on Diesel Particulate Filter (SDPF) of an automotive system including an internal combustion engine equipped with an aftertreatment system for treating exhaust gas. In particular, an electronic control unit, processor, embedded controller, onboard computer, or other means is configured to perform a SDPF regeneration, obtain temperature values for the SDPF inlet and SDPF outlet during the SDPF regeneration, calculate a rate of increase of SDPF outlet temperature and a rate of increase of SDPF inlet temperature using these temperature values, calculate a ratio between the rate of increase of SDPF outlet temperature values and the rate of increase of SDPF inlet temperature values, and modify the exhaust gas composition, if the calculated ratio is greater than a threshold thereof This aspect of the present disclosure has similar effects with respect to the previous embodiment, namely it helps to avoid excessive increase of temperature inside the SDPF, for example in case of a DTI event, thus preventing this component from hardware damage and avoiding premature aging of the same and helps to predict and thus avoid thermal events which may cause a high value of the incidents Per Thousand Vehicles (IPTV) parameter.

According to another aspect, the apparatus includes respective SDPF inlet and outlet temperature sensors for obtaining SDPF inlet and SDPF outlet temperature values include. An effect of this aspect is that current and reliable values of temperature are obtained in real time.

According to another aspect, the apparatus includes means for reducing the oxygen quantity in the exhaust gas to modify the exhaust gas composition. An effect of this aspect is that it helps to prevent an overheating of the SDPF.

According to still another aspect, the means for reducing the oxygen quantity in the exhaust gas includes a valve connecting a long route EGR conduit to an intake duct of the internal combustion engine. According to still another aspect of the present disclosure, the means for reducing the oxygen quantity in the exhaust gas operates a throttle valve regulating a flow of air into an intake manifold of the internal combustion engine. Also this aspect has the effect that the oxygen content in the exhaust gas can be modified according to the needs.

According to a further aspect, the apparatus include an electronic control unit, processor, embedded controller, onboard computer, or other means for varying a fuel injection quantity means to modify the exhaust gas composition. An effect of this aspect is to regulate and reduce the temperature of the SDPF.

According to a further aspect, the apparatus includes an electronic control unit, processor, embedded controller, onboard computer, or other means for varying a fuel injection timing to modify the exhaust gas composition. An effect of this aspect is to regulate and reduce the temperature of the SDPF.

According to still another aspect, the apparatus includes an electronic control unit, processor, embedded controller, onboard computer, or other means for interrupting a SDPF regeneration to modify the exhaust gas composition. An effect of this aspect is to reduce the temperature of the SDPF.

According to another aspect of the present disclosure, the apparatus includes an electronic control unit, processor, embedded controller, onboard computer, or other means to set the threshold value as a function of a percentage of the duration of the SDPF regeneration. An effect of this aspect is that the threshold value can be effectively calibrated depending on the specifics of the regeneration process.

According to still another aspect of the present disclosure, the apparatus includes an electronic control unit, processor, embedded controller, onboard computer, or other means to set the threshold value as a function of an estimated soot residual quantity in the SDPF. An effect of this aspect is that the threshold value can he effectively calibrated depending on the current conditions of the SDPF.

According to a further aspect of the present disclosure, the apparatus includes an electronic control unit, processor, embedded controller, onboard computer, or other means to calculate a ratio between the rate of increase of SDPF outlet temperature values and the rate of increase of SDPF inlet temperature values, if the SDPF regeneration has been performed for less than a predetermined percentage of its duration. An effect of this aspect is to have enough time at the start of the regeneration process to predict the occurrence of a possible Drop To Idle (DTI) event.

The method according to one of its aspects can be carried out with the help of a computer program including a program-code for carrying out all the method described above, and in the form of computer program product including the computer program. The computer program product can be embodied as a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
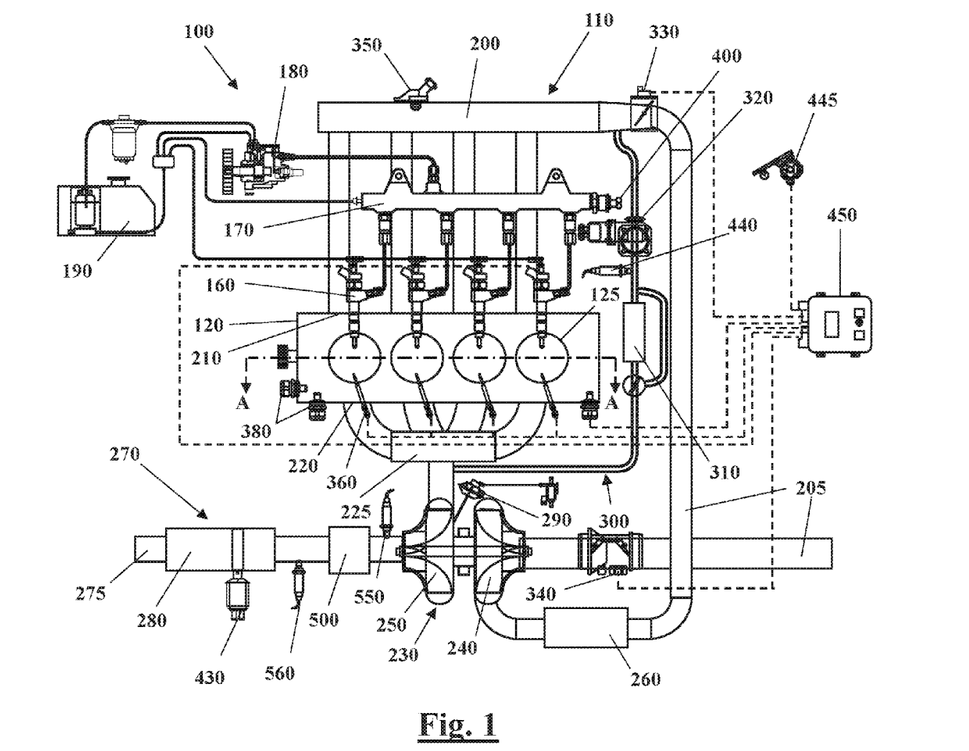
FIG. 1 shows an automotive system.
Figure 2:
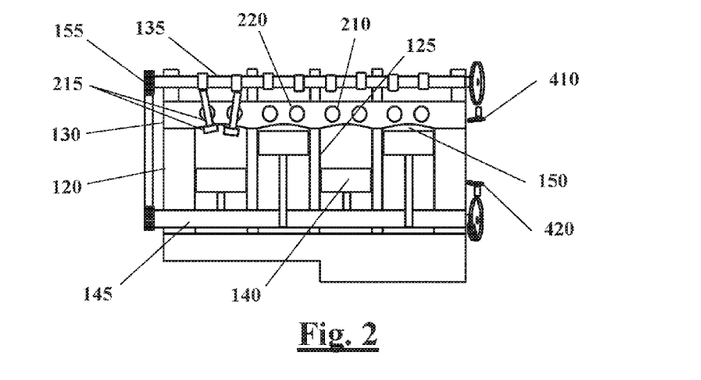
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle valve 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an aftertreatment system 270, This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The aftertreatment system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters, such as a Diesel Particulate Filter (DPF).

The aftertreatment system 270 includes a Diesel Oxidation Catalyst (DOC) 520 and Selective Catalytic Reduction on Diesel Particulate Filter (SDPF) 500, the SDPF being associated with a temperature sensor upstream of the SDPF 550 and a temperature sensor downstream of the SDPF 560, both sensors being used in combination to measure a temperature values at an outlet and at an inlet of the SDPF 500.

Other embodiments may include a first exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

While the first EGR conduit defines a short route for the exhaust gas recirculation, a second EGR system 690 may be provided in the automotive system 100, the second EGR system 690 being equipped with a second EGR conduit 695 which fluidly connects the exhaust line downstream of the aftertreatment systems to the intake line upstream the intake manifold and is connected therein by the interposition of a three-way valve 630. As an alternative to the three-way valve 630, two separate throttle bodies may be used, The second EGR conduit 695 defines a long route which includes also a relevant portion of the exhaust line and a relevant portion of the intake line and is better explained with reference to FIG. 3.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle valve 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
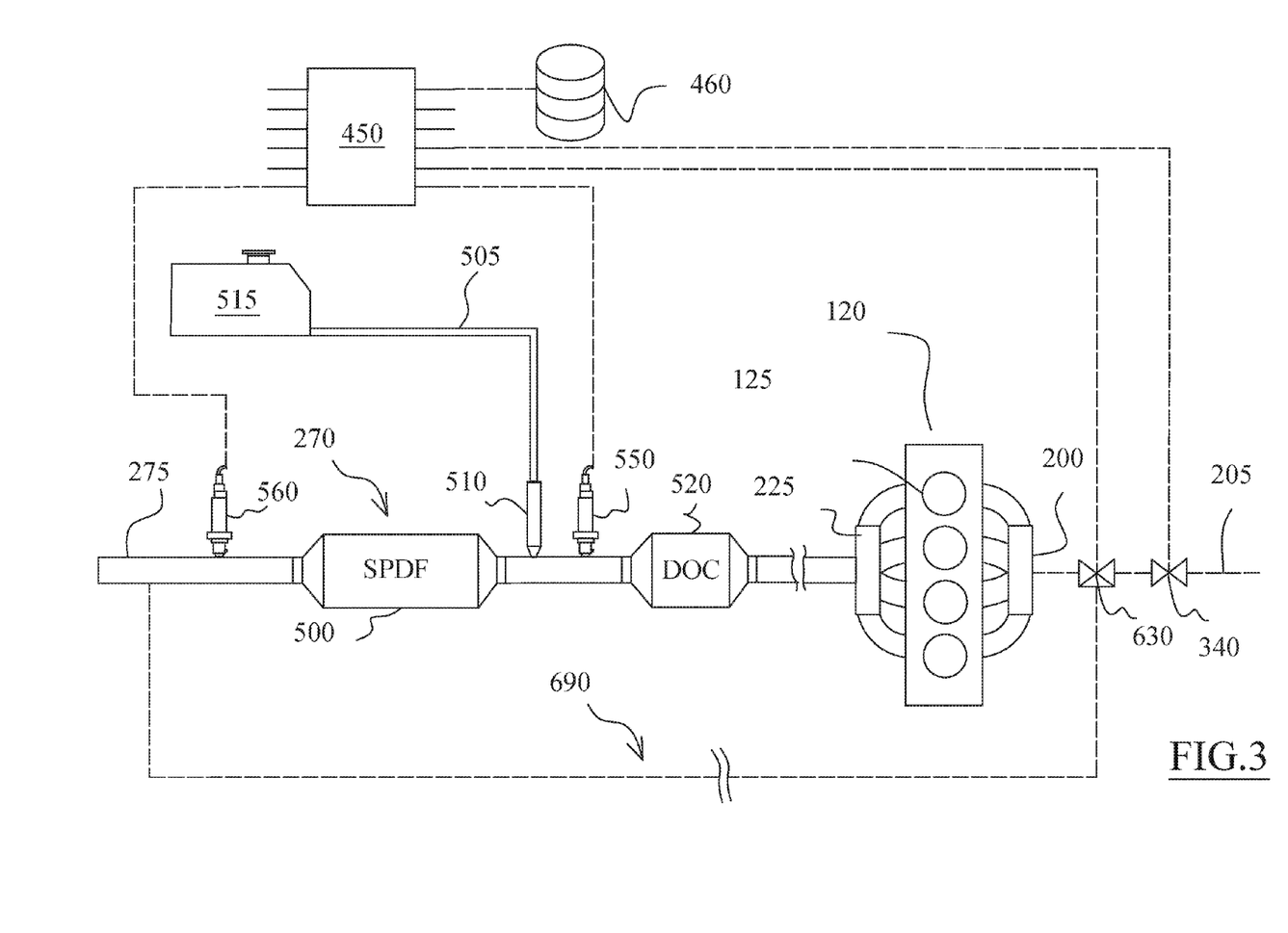
FIG. 3 shows some details of the automotive system of FIG. 1.

FIG. 3 shows some details of the automotive system 100 of FIG. 1 a Selective Catalytic Reduction on Diesel Particulate Filter (SDPF) 500 is provided in the exhaust pipe 275. The SDPF 500 is placed downstream of a Diesel Oxidation Catalyst (DOC) 520. The SDPF 500 is associated with a urea injector 510, which is located in the exhaust pipe 275 upstream of the SDPF 500, for injecting a Diesel Exhaust Fluid (DEF), such as urea ($CH_4N_2O$), in the exhaust gas stream. Due to thermo-hydrolysis reactions occurring inside the exhaust pipe 275, urea is converted into a gaseous reducing agent, typically ammonia ($NH_3$), which is absorbed inside the SCR portion of the SDPF 500, so as to promote $NO_x$ reduction reactions. Urea is contained in a urea tank 515 and reaches the urea injector 510 through a urea pipe 505. The injections of urea are commanded by the ECU 450, according to engine operating conditions or other parameters.

According to an embodiment of the present disclosure, the method is initiated during a SDPF regeneration is being performed. In particular, if the SDPF regeneration is still running and its duration is below a calibratable percentage, for example below 15%, temperature values (EGT2, EGT3) for the SDPF inlet and SDPF outlet are obtained, for example by measurement of the respective sensors, namely using the temperature sensor upstream of the SDPF 550 and the temperature sensor downstream of the SDPF 560. These temperature values are measured at different intervals of time, namely SDPF inlet temperature EGT2(t−1) is measured at an instant t−1, and SDPF inlet temperature EGT2(t) is measured at an instant t, in order to calculate a rate of increase of SDPF inlet temperature (RateEGT2). In a similar fashion, SDPF outlet temperature EGT3(t−1) is measured at an instant t−1, and SDPF outlet temperature EGT3(t) is measured at an instant t, in order to calculate a rate of increase of SDPF outlet temperature (RateEGT3).

A ratio (RatioEGT32) between the rate of increase of SDPF outlet temperature (RateEGT3) and the rate of increase of SDPF inlet temperature (RateEGT2) is calculated. This ratio (RatioEGT32) is then compared with a maximum threshold thereof (MaxRatio) and if the calculated ratio (RatioEGT32) is greater than the threshold (MaxRatio) an excessive SDPF temperature condition that may lead to a Drop To Idle (DTI) event is predicted. The threshold value (MaxRatio) can be predetermined on the basis of calibrated maps obtained by an experimental activity in which multiple regenerations are performed at different soot levels, taking also into account SDPF inlet temperature sensor 550 and SDPF outlet temperature sensor 560 positions in the aftertreatment system 270.

Other factors may be taken into account to determine the threshold value (MaxRatio), namely the SDPF 500 dimensions, expressed for example in terms of length and of volume of the SDPF 500. Moreover, the threshold value (MaxRatio) may also be a function of a percentage of the duration of the SDPF regeneration. The threshold value (MaxRatio) may also be a function of an estimated soot residual quantity in the SDPF 500. As is known in the art, the soot residual quantity in the SDPF 500 can be estimated using a physical model stored in a data carrier 460 associated with the ECU 450.

All the mentioned factors can be considered individually or in combination in order to determine threshold value (MaxRatio), namely the maximum value of the (RatioEGT23) that does not result into a Drop To Idle (DTI) event.

Figure 4:
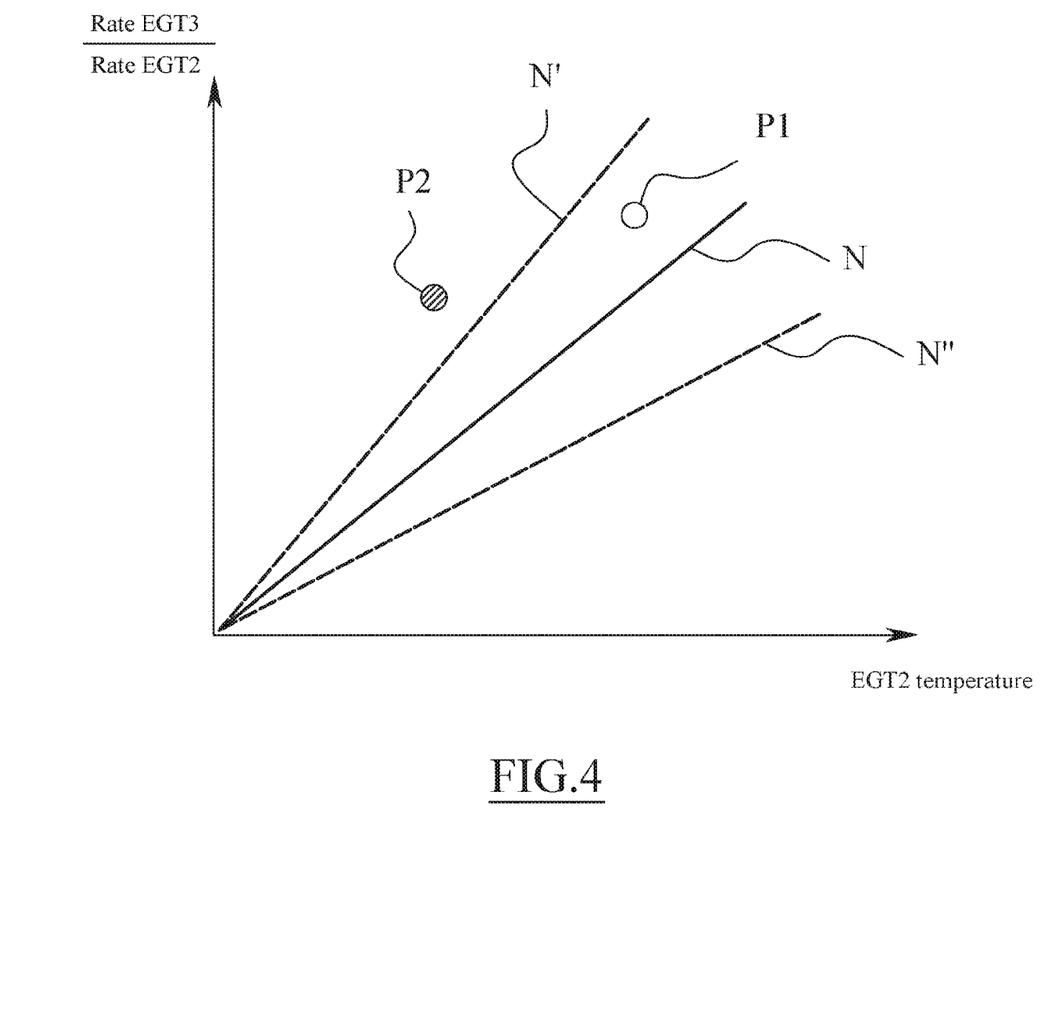
FIG. 4 is a graph representing different conditions in which a regeneration may be performed.

FIG. 4 is a graph representing different conditions during which a regeneration may be performed, as a function of SDPF inlet temperature (EGT2) and of the ratio (RatioEGT32) between the rate of increase of SDPF outlet temperature (RateEGT3) and the rate of increase of SDPF inlet temperature (RateEGT2). In the graph of FIG. 4, line N represents a nominal performance of the SDPF system during a regeneration, while lines N' and N" represent the maximum deviation from the nominal performance acceptable in order to avoid a DTI event. In view of the above, point PT represents a condition in which no DTI event occurs, while point P2, which is external with respect to the area defined by lines N' and N" represents a condition in which a DTI event occurs.

Figure 5:
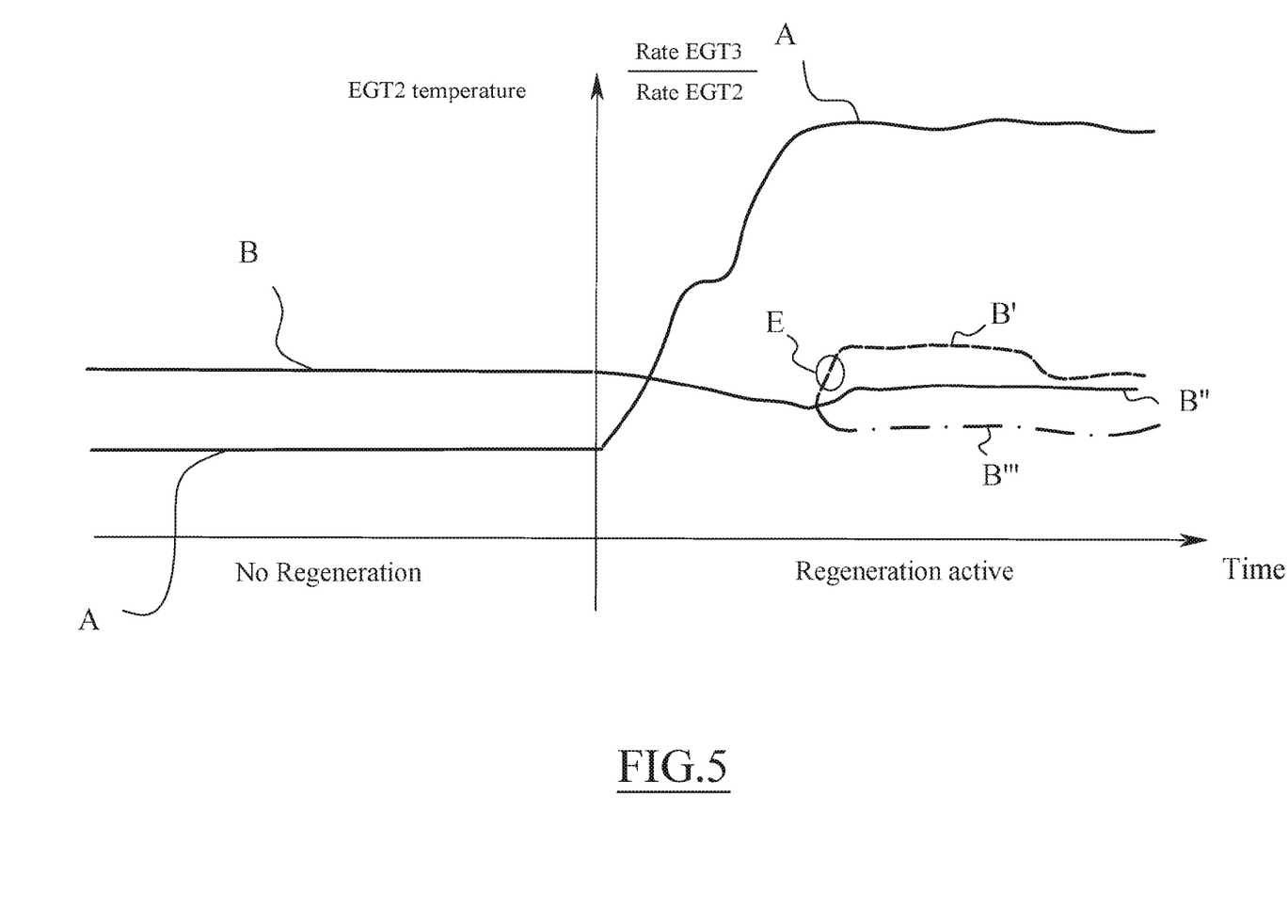
FIG. 5 is a graph representing different regeneration profiles as a function of time.

FIG. 5 is a graph representing different regeneration profiles as a function of time. Curve A represents the value of SDPF inlet temperature (EGT2) as a function of time, during a first period in which no regeneration is active and during a second period in which a regeneration is active and therefore SDPF inlet temperature (EGT2) increases. The ratio (RatioEGT32) between the rate of increase of SDPF outlet temperature (RateEGT3) and the rate of increase of SDPF inlet temperature (RateEGT2) is also represented in FIG. 5 as curve B.

During regeneration, the ratio (RatioEGT32) initially decreases then three different conditions may occur. The first condition is represented by line B'" which indicates a condition in which no soot is trapped in the SDPF. in this case, the ratio (RatioEGT32) decreases even further. The second condition is represented by line B" which indicates a condition in which some amount of soot is trapped in the SDPF, for example 8 g/L, but no DTI event occurs during regeneration. In this case, the ratio (RatioEGT32) remains substantially constant.

Finally, a third condition is represented by line B' which indicates a condition in which some amount of soot is trapped in the SDPF, for example 8 g/L, and a DTI event will occur during regeneration. In this case, the ratio (RatioEGT32) increases rapidly. The rapid increase of the ratio (RatioEGT32) is identified by ellipse E and monitoring this increase as explained in the present description, predicts the occurrence of a DTI event. in particular, if the calculated ratio (RatioEGT32) is greater than the threshold value (MaxRatio) an DTI event may be predicted.

Figure 6:
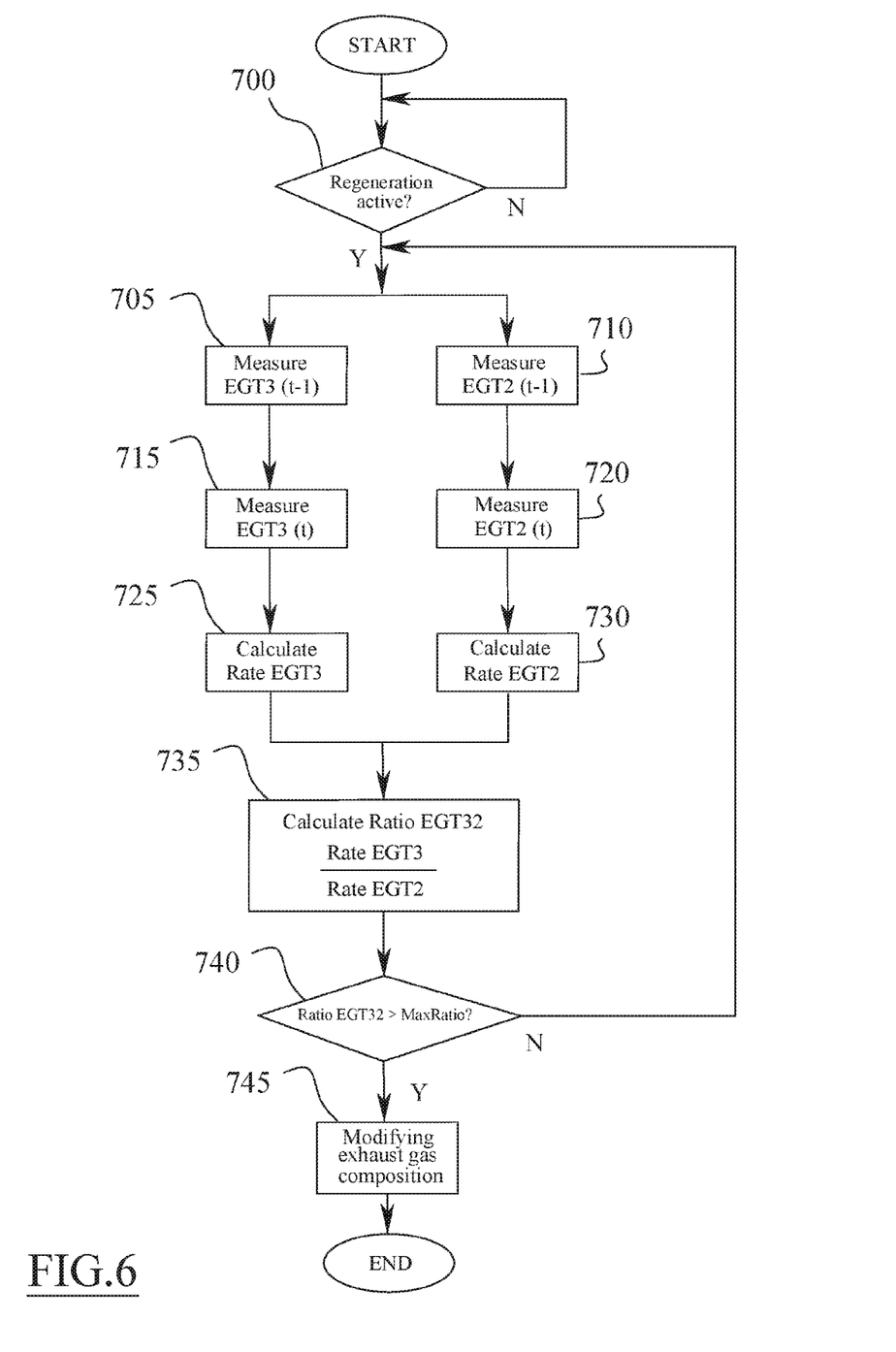
FIG. 6 is a flowchart representing an embodiment of the present disclosure.

FIG. 6 is a flowchart representing an embodiment of the present disclosure. As a first step, a check is performed to determine if a regeneration is active (block 700). In the affirmative, SDPF inlet and SDPF outlet temperature values (EGT2, EGT3) are obtained in parallel first by measuring SDPF outlet temperature value EGT3(t−1) and SDPF inlet temperature value EGT2(t−1) at an instant t−1 (blocks 705, 710) and then, at a subsequent instant t, by measuring SDPF outlet temperature value EGT3(t) and SDPF inlet temperature value EGT2(t) (blocks 715, 720).

Using SDPF outlet temperature value EGT3(t−1) and SDPF outlet temperature value EGT3(t), the rate of increase of SDPF outlet temperature (RateEGT3) can be calculated (block 725). In a similar fashion, using SDPF inlet temperature value EGT2(t−1) and SDPF inlet temperature value EGT2(t), the rate of increase of SDPF inlet temperature (RateEGT2) can be calculated (block 730).

With this information, the ratio (RatioEGT32) between the rate of increase of SDPF outlet temperature (RateEGT3) and the rate of increase of SDPF inlet temperature (RateEGT2) can be calculated (block 735). The ratio (RatioEGT32) is then compared with the maximum threshold thereof (MaxRatio) (block 740). if the above calculated value of the ratio (RatioEGT32) is less than the maximum threshold value (MaxRatio), new SDPF inlet and SDPF outlet temperature values (EGT2, EGT3) are calculated again for a new cycle of the method. If, on the contrary, the value of the ratio (RatioEGT32) is greater than the maximum threshold value (MaxRatio), an excess temperature condition that may lead to a DTI event is predicted. in this case, the exhaust gas composition may be modified (block 745).

The proposed strategy avoids excessive increase of temperature inside the component in case of a DTI event, thus preventing hardware damage and avoiding premature aging of the same. The proposed strategy also allows time to implement countermeasures to avoid a DTI event. Such countermeasures are directed to modify the exhaust gas composition, in order to reduce the temperature of the SDPF and/or to prevent that too strong exothermic reactions occurs within the SDPF. For example, the exhaust gas composition may be modified by reducing the oxygen quantity in the exhaust gas.

One possibility for reducing the oxygen quantity in the exhaust gas is to operate the three-way valve 630 (or analogous valve) connecting the long route EGR conduit 695 to the intake duct 205 of the internal combustion engine 110. As an alternative, the oxygen quantity in the exhaust gas may be reduced by operating the throttle valve 330 to regulate a flow of air into the intake manifold 200 of the internal combustion engine 110. Another possibility to modify the exhaust gas composition includes varying a fuel injection quantity or varying a fuel injection timing in such a way as to obtain a reduction of the temperature of the SDPF. Still another possibility is to modify the exhaust gas composition includes interrupting the SDPF 500 regeneration.

In the various embodiments of the present disclosure, calculations are carried out by the ECU 450 according to computer programs stored in the data carrier 460.

While at least one exemplary embodiment has been presented in the foregoing detailed description, it should be appreciated that a vast number of variations exist. It should also he appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating an internal combustion engine equipped with an aftertreatment system for treating exhaust gas, the method comprising:
   regenerating a selective catalytic reduction catalyst on a particulate filter (SDPF);
   obtaining temperature values at an inlet and an outlet of the particulate filter during said regeneration;
   calculating a rate of change of the outlet temperature and a rate of change of the inlet temperature based on the temperature values;
   calculating a ratio between the rate of change of the outlet temperature values and the rate of change of the inlet temperature values; and
   modifying the exhaust gas composition when the calculated ratio is greater than a threshold value thereof.

2. The method according to claim 1, further comprising obtaining SDPF inlet and SDPF outlet temperature values from an SDPF inlet temperature sensor and an SDPF outlet temperature sensor.

3. The method according to claim 1, further comprising reducing the oxygen quantity in the exhaust gas to modify the exhaust gas composition.

4. The method according to claim 3, further comprising operating a valve connecting a long route EGR conduit to an intake duct of the internal combustion engine to reduce the oxygen quantity in the exhaust gas.

5. The method according to claim 3 further comprising operating a throttle valve regulating a flow of air into an intake manifold of the internal combustion engine to reduce the oxygen quantity in the exhaust gas.

6. The method according to claim 1, further comprising varying a fuel injection quantity to modify the exhaust gas composition.

7. The method according to claim 1, further comprising varying a fuel injection timing to modify the exhaust gas composition.

8. The method according to claim 1, further comprising interrupting the SDPF regeneration to modify the exhaust, gas composition.

9. The method according to claim 1, wherein the threshold value comprises a function of a percentage of the duration of the SDPF regeneration.

10. The method according to claim 1, wherein the threshold value comprises a function of an estimated soot residual quantity in the SDPF.

11. The method according to claim 1, further comprising calculating a ratio between the rate of increase for a plurality of outlet temperature values and the rate of increase for a plurality of inlet temperature values when said regeneration has been performed for less than a predetermined percentage of its duration.

12. A non-transitory computer readable medium storing a computer program comprising computer-code suitable to enable an electronic control unit for performing the method according to claim 1.

13. An apparatus for operating a Selective Catalytic Reduction Catalyst on Diesel Particulate Filter (SDPF) of an automotive system having an internal combustion engine equipped with an aftertreatment system for treating exhaust gas, the apparatus comprising an electronic control unit configured to:
  regenerate the SDPF;
  obtain temperature values at an inlet and an outlet of the particulate filter during said regeneration;
  calculate a rate of change of the outlet temperature and a rate of change of the inlet temperature based on the temperature values,
  calculate a ratio between the rate of change of the outlet temperature values and the rate of change of the inlet temperature values; and
  modify the exhaust gas composition when the calculated ratio is greater than a threshold value thereof.

14. The apparatus according to claim 13, further comprising an inlet temperature sensor generating the inlet temperature value and an outlet temperature sensor generating the outlet temperature value.

* * * * *